(12) United States Patent
Li et al.

(10) Patent No.: US 9,560,486 B2
(45) Date of Patent: Jan. 31, 2017

(54) METHOD FOR IDENTIFYING MOTION STATUS OF MOBILE TERMINAL, AND MOBILE TERMINAL

(71) Applicant: Huawei Technologies Co., Ltd., Shenzhen (CN)

(72) Inventors: Li Li, Shenzhen (CN); Qiang Ding, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/923,094

(22) Filed: Oct. 26, 2015

(65) Prior Publication Data
US 2016/0044462 A1 Feb. 11, 2016

Related U.S. Application Data

(63) Continuation of application No. PCT/CN2013/087024, filed on Nov. 13, 2013.

(30) Foreign Application Priority Data

Apr. 28, 2013 (CN) .......................... 2013 1 0157676

(51) Int. Cl.
*H04W 4/02* (2009.01)
*H04W 64/00* (2009.01)
(Continued)

(52) U.S. Cl.
CPC .............. *H04W 4/023* (2013.01); *H04W 64/00* (2013.01); *H04W 64/003* (2013.01);
(Continued)

(58) Field of Classification Search
CPC .... H04W 4/023; H04W 64/00; H04W 64/003; H04W 84/12; H04W 88/02; H04W 88/08
(Continued)

(56) References Cited

U.S. PATENT DOCUMENTS

2007/0018890 A1* 1/2007 Kulyukin ............. G01C 21/005
342/357.31
2007/0183344 A1 8/2007 Joshi
(Continued)

FOREIGN PATENT DOCUMENTS

CN 1501610 A 6/2004
CN 101627561 A 1/2010
(Continued)

OTHER PUBLICATIONS

Foreign Communication From a Counterpart Application, European Application No. 13883674.7, Extended European Search Report dated Mar. 14, 2016, 9 pages.
(Continued)

*Primary Examiner* — Kamran Afshar
*Assistant Examiner* — Nicole Louis-Fils
(74) *Attorney, Agent, or Firm* — Conley Rose, P.C.

(57) ABSTRACT

A method for identifying a motion status of a mobile terminal, and a mobile terminal are provided. The method includes collecting information about multiple wireless local area network (WLAN) access points during each time of scanning, where the information includes a basic service set identifier and signal strength; calculating a belief value and a list orthogonality value according to the information about the multiple WLAN access points; and presetting a belief decision threshold and a list orthogonality decision threshold, and comparing the decision thresholds with calculated values to acquire the motion status of the mobile terminal. Therefore, the motion status of the mobile terminal may be acquired without making a change in any hardware on an existing mobile terminal. In addition, the present disclosure is applicable to an area covered by multiple wireless local area network access points.

16 Claims, 5 Drawing Sheets

(51) Int. Cl.
  *H04W 84/12* (2009.01)
  *H04W 88/02* (2009.01)
  *H04W 88/08* (2009.01)
(52) U.S. Cl.
  CPC .......... *H04W 64/006* (2013.01); *H04W 84/12* (2013.01); *H04W 88/02* (2013.01); *H04W 88/08* (2013.01)
(58) Field of Classification Search
  USPC ................................ 455/456–459, 41.1–41.3
  See application file for complete search history.

(56) References Cited

U.S. PATENT DOCUMENTS

| | | | |
|---|---|---|---|
| 2008/0207278 A1 | 8/2008 | Qi et al. | |
| 2010/0248668 A1 | 9/2010 | Katayama et al. | |
| 2010/0255781 A1* | 10/2010 | Wirola | G01S 19/34 455/41.2 |
| 2012/0004881 A1* | 1/2012 | Jung | G01C 22/006 702/141 |
| 2014/0141796 A1* | 5/2014 | Marti | G01S 5/0252 455/456.1 |

FOREIGN PATENT DOCUMENTS

| | | |
|---|---|---|
| CN | 101822094 A | 9/2010 |
| CN | 102111434 A | 6/2011 |
| CN | 201978444 U | 9/2011 |
| CN | 102355530 A | 2/2012 |

OTHER PUBLICATIONS

Partial English Translation and Abstract of Chinese Patent Application No. CN102111434, Feb. 2, 2016, 4 pages.
Partial English Translation and Abstract of Chinese Patent Application No. CN201978444, Feb. 2, 2016, 3 pages.
Partial English Translation and Abstract of Chinese Patent Application No. CN001501610, Oct. 28, 2015, 3 pages.
Foreign Communication From a Counterpart Application, PCT Application No. PCT/CN2013/087024, English Translation of International Search Report dated Jan. 23, 2014, 2 pages.
Foreign Communication From a Counterpart Application, PCT Application No. PCT/CN2013/087024, English Translation of Written Opinion dated Jan. 23, 2014, 12 pages.

* cited by examiner

METHOD FOR IDENTIFYING MOTION STATUS OF MOBILE TERMINAL, AND MOBILE TERMINAL

CROSS-REFERENCE TO RELATED APPLICATIONS

This application is a continuation of International Application No. PCT/CN2013/087024, filed on Nov. 13, 2013, which claims priority to Chinese Patent Application No. 201310157676.7, filed on Apr. 28, 2013, both of which are hereby incorporated by reference in their entireties.

TECHNICAL FIELD

The present disclosure relates to the communications field, and in particular, to a method for identifying a motion status of a mobile terminal, and a mobile terminal.

BACKGROUND

Motion status identification is one of important content of context awareness. With popularization of mobile terminals, intelligent services with better experience may be provided for a user by inferring, using a mobile terminal, a motion status of the user, triggering, according to the motion status of the user, a change in a status or a function of the mobile terminal, and providing for the user an intelligent mobile application, such as personalized recommendation or accurate advertisement push according to an inferred higher-class user situation. In a mobile terminal application scenario, difficulties and challenges of motion status identification are how prepared identification is performed on motion of different users in a complex and changeable environment using sensors built in most mobile terminals and without the help of a function of another additional hardware. In consideration of limited computing, storage and energy resources of a terminal, an algorithm involved in motion status identification is as simple as possible, and a dependent function module cannot generate a large number of extra function overheads.

A user is positioned by means of satellite positioning (for example, a global positioning system (GPS)), and a difference between longitudes and a difference between latitudes within a time interval are converted into a motion speed for indirectly inferring a motion status of the user. This manner requires a satellite positioning function be additionally enabled. Generally, power consumption of a GPS on a mobile terminal is higher; time to first fix is longer; and this manner often cannot be used in a shaded area (for example, indoors or in an underground passage).

A motion status of a user is inferred by means of feature extraction, classification, and other means and according to data collected by an inertial sensor, such as an acceleration sensor or a gyroscope. Accuracy of identification using this method is more greatly affected by a placement position of a mobile phone and is more closely related to a posture and a motion habit of the user; algorithm complexity is generally higher; and a large number of training samples need to be collected in advance.

Standard deviation analysis is performed on wireless signal strength data of a base station on a traditional wireless cellular network, still and motion states are distinguished according to a standard deviation, and then, feature matching is performed on a signal sequence and a waveform in a sample library to distinguish two motion types: "walking" and "driving". When the two motion types "walking" and "driving" are distinguished, similarity analysis needs to be performed on the waveform in real time. On one hand, calculation complexity is higher, and a challenge is brought to a processing capacity of a mobile terminal. On the other hand, signal samples need to be collected and stored in advance, and when there is a large amount of data in the sample library, a burden is brought to limited storage space of the mobile terminal.

SUMMARY

Objectives of embodiments of the present disclosure are to provide a method for identifying a motion status of a mobile terminal, and a mobile terminal, so as to resolve a problem about how a motion status of a mobile terminal is determined.

According to a first aspect, a method for identifying a motion status of a mobile terminal is provided, where the method includes scanning for wireless local area network (WLAN) access points of the mobile terminal once every specified sampling period, and collecting information about multiple WLAN access points that are acquired during each time of scanning, where the information includes a basic service set identifier and signal strength; calculating a belief value and a list orthogonality value according to the information about the multiple WLAN access points that are acquired within a set time window length; comparing the calculated belief value with a preset belief decision threshold; when the calculated belief value is greater than the preset belief decision threshold, comparing the calculated list orthogonality value with a preset list orthogonality decision threshold; if the calculated list orthogonality value is less than a minimum value of the preset list orthogonality decision threshold, determining that the motion status of the mobile terminal is still; and if the calculated list orthogonality value is greater than a maximum value of the preset list orthogonality decision threshold, determining that the motion status of the mobile terminal is driving.

With reference to the first aspect, in a first possible implementation manner of the first aspect, the calculating a belief value includes multiplying a quantity of multiple WLAN access points acquired in the scanning performed every specified sampling period by a preset first time dimension weight factor to calculate an average quantity of WLAN access points after each time of scanning; and adding all the average quantities of WLAN access points to acquire the belief value, where the average quantities are calculated within the set time window length.

With reference to the first possible implementation manner of the first aspect, in a second possible implementation manner of the first aspect, the calculating a list orthogonality value includes comparing, within the set time window length, information about multiple WLAN access points that are acquired during the first time of scanning with information about multiple WLAN access points that are acquired during the second time of scanning to acquire information about non-duplicate WLAN access points that are acquired during the two times of scanning; acquiring, according to a preset degree-of-contribution function, a degree of contribution of signal strength of each of the non-duplicate WLAN access points to the list orthogonality value; adding degrees of contribution of all of the non-duplicate WLAN access points; multiplying a value, which is acquired by the adding, by a preset second time dimension weight factor to acquire an average degree of contribution; adding a quantity of non-duplicate WLAN access points and a quantity of duplicate WLAN access points that are acquired during the two times of scanning to acquire a quantity of WLAN access points; and dividing the average degree of contribution by the quantity of WLAN access points to acquire a list orthogonality value of the first time of scanning, where a list orthogonality value of the second time of scanning is acquired by comparing the information about the multiple WLAN access points that are acquired during the second time of scanning with information about multiple WLAN access points that are acquired during the third time of scanning, a list orthogonality value of the third time of scanning is obtained by comparing the information about the multiple WLAN access points that are acquired during the third time of scanning with information about multiple WLAN access points that are acquired during the fourth time of scanning, and so on, and a list orthogonality value of the $(N-1)^{th}$ time of scanning is acquired, assuming that in total N times of scanning are performed in the specified sampling periods within the set time window length; and adding the list orthogonality values of the first time of scanning, the second time of scanning, . . . , and the $(N-1)^{th}$ time of scanning to acquire a list orthogonality value of the N times of scanning within the set time window length.

With reference to the first aspect, the first possible implementation manner of the first aspect, or the second possible implementation manner of the first aspect, in a third possible implementation manner of the first aspect, the method further includes, if the calculated belief value is less than the preset belief decision threshold, determining that the motion status of the mobile terminal cannot be identified.

With reference to the first aspect, the first possible implementation manner of the first aspect, the second possible implementation manner of the first aspect, or the third possible implementation manner of the first aspect, in a fourth possible implementation manner of the first aspect, the method further includes calculating a signal fluctuation rate according to the information about the multiple WLAN access points that are acquired within the set time window length, where if the calculated list orthogonality value is greater than the minimum value of the preset list orthogonality decision threshold and less than the maximum value of the list orthogonality decision threshold, comparing the calculated signal fluctuation rate with a preset signal fluctuation rate decision threshold.

With reference to the fourth possible implementation manner of the first aspect, in a fifth possible implementation manner of the first aspect, the method further includes, if the calculated signal fluctuation rate is greater than the preset signal fluctuation rate decision threshold, determining that the motion status of the mobile terminal is walking; and if the calculated signal fluctuation rate is less than or equal to the preset signal fluctuation rate decision threshold, determining that the motion status of the mobile terminal is still.

With reference to the first aspect or the first possible implementation manner of the first aspect, or with reference to the second possible implementation manner of the first aspect, the third possible implementation manner of the first aspect, the fourth possible implementation manner of the first aspect, or the fifth possible implementation manner of the first aspect, in a sixth possible implementation manner of the first aspect, the method further includes performing determining according to motion statuses of the mobile terminal within several successive time windows, and setting a determined motion status, which occurs for most times in the motion statuses of the mobile terminal, of the mobile terminal as a final motion status of the mobile terminal within the several successive time windows.

According to a second aspect, a mobile terminal is provided, where the mobile terminal provides a collecting unit configured to scan for WLAN access points of the mobile terminal once every specified sampling period, and collect information about multiple WLAN access points that are acquired during each time of scanning, where the information includes a basic service set identifier and signal strength; a calculation unit configured to calculate a belief value and a list orthogonality value according to the information about the multiple WLAN access points that are acquired within a set time window length; a first comparison unit configured to compare the calculated belief value with a preset belief decision threshold; a second comparison unit configured to, when the calculated belief value is greater than the preset belief decision threshold, compare the calculated list orthogonality value with a preset list orthogonality decision threshold; a first determining unit configured to, if the calculated list orthogonality value is less than a minimum value of the preset list orthogonality decision threshold, determine that motion status of the mobile terminal is still; and a second determining unit configured to, if the calculated list orthogonality value is greater than a maximum value of the preset list orthogonality decision threshold, determine that motion status of the mobile terminal is driving.

With reference to the second aspect, in a first possible implementation manner of the second aspect, the step of calculating the belief value by the calculation unit is multiplying a quantity of multiple WLAN access points acquired in the scanning performed every specified sampling period by a preset first time dimension weight factor to calculate an average quantity of WLAN access points after each time of scanning; and adding all the average quantities of WLAN access points to acquire the belief value, where the average quantities are calculated within the set time window length.

With reference to the first possible implementation manner of the second aspect, in a second possible implementation manner of the second aspect, the step of calculating the list orthogonality value by the calculation unit is comparing, within the set time window length, information about multiple WLAN access points that are acquired during the first time of scanning with information about multiple WLAN access points that are acquired during the second time of scanning to acquire information about non-duplicate WLAN access points that are acquired during the two times of scanning; obtaining, according to a preset degree-of-contribution function, a degree of contribution of signal strength of each of the non-duplicate WLAN access points to the list orthogonality value; adding degrees of contribution of all of the non-duplicate WLAN access points; multiplying a value, which is acquired by the adding, by a preset second time dimension weight factor to obtain an average degree of contribution, adding a quantity of non-duplicate WLAN access points and a quantity of duplicate WLAN access points that are acquired during the two times of scanning to obtain a quantity of WLAN access points; and dividing the average degree of contribution by the quantity of WLAN access points to acquire a list orthogonality value of the first time of scanning; where a list orthogonality value of the second time of scanning is acquired by comparing the information about the multiple WLAN access points that are acquired during the second time of scanning with information about multiple WLAN access points that are acquired the third time of scanning, a list orthogonality value of the third time of scanning is obtained by comparing the information about the multiple WLAN access points that are acquired during the third time of scanning with information about multiple WLAN access points that are acquired during the fourth time of scanning, and so on, and a list orthogonality value of the $(N-1)^{th}$ time of scanning is acquired, assuming that in total N times of scanning are performed in the specified sampling periods within the set time window length; and adding the list orthogonality values of the first time of scanning, the second time of scanning, . . . , and the $(N-1)^{th}$ time of scanning to acquire a list orthogonality value of the N times of scanning within the set time window length.

With reference to the second aspect, the first possible implementation manner of the second aspect, or the second possible implementation manner of the second aspect, in a third possible implementation manner of the second aspect, the mobile terminal further includes a third determining unit, where the third determining unit is configured to, if the calculated belief value is less than the preset belief decision threshold, determine that motion status of the mobile terminal cannot be identified.

With reference to the second aspect, the first possible implementation manner of the second aspect, the second possible implementation manner of the second aspect, or the third possible implementation manner of the second aspect, in a fourth possible implementation manner of the second aspect, the mobile terminal further includes a calculation subunit, where the calculation subunit is configured to calculate a signal fluctuation rate according to the information about the multiple WLAN access points that are acquired within the set time window length; and the mobile terminal further includes a third comparison unit, where the third comparison unit is configured to, if the calculated list orthogonality value is greater than the minimum value of the preset list orthogonality decision threshold and less than the maximum value of the list orthogonality decision threshold, compare the calculated signal fluctuation rate with a preset signal fluctuation rate decision threshold.

With reference to the fourth possible implementation manner of the second aspect, in a fifth possible implementation manner of the second aspect, the method further includes a fourth determining unit and a fifth determining unit; the fourth determining unit is configured to, if the calculated signal fluctuation rate is greater than the preset signal fluctuation rate decision threshold, determine that motion status of the mobile terminal is walking; and the fifth determining unit is configured to, if the calculated signal fluctuation rate is less than or equal to the preset signal fluctuation rate decision threshold, determine that motion status of the mobile terminal is still.

With reference to the second aspect, the first possible implementation manner of the second aspect, the second possible implementation manner of the second aspect, the third possible implementation manner of the second aspect, the fourth possible implementation manner of the second aspect, or the fifth possible implementation manner of the second aspect, in a sixth possible implementation manner of the second aspect, the mobile terminal further includes a processing unit, where the processing unit is configured to perform determining according to motion statuses of the mobile terminal within several successive time windows, and set a determined motion status, which occurs for most times in the motion statuses of the mobile terminal, of the mobile terminal as a final motion status of the mobile terminal within the several successive time windows.

Compared with the prior art, the embodiments of the present disclosure provide a method for identifying a motion status of a mobile terminal using a WLAN signal to perform determining and the mobile terminal. A time window length is set, and multiple WLAN access points acquired within the set time window length are collected, such that an application scope of the method is wide, that is, the method is applicable to an area covered by multiple WLAN access points and is not limited by an indoor or outdoor site. According to the method, a calculation process is simple, that is, the motion status of the mobile terminal may be determined simply by calculating a belief value and a list orthogonality value of the multiple WLAN access points, comparing the calculated belief value with a preset belief value, and comparing the calculated list orthogonality value with a preset list orthogonality value. Therefore, implementability of the method is high and the method may be directly applied to a mobile terminal having a WLAN function in the market without making a change in hardware. Because the method has no special requirement on a placement location of the mobile terminal during measurement and is irrelevant to a posture or a motion habit of a user, the method is universal. Because a quantity of feature parameters required in the method is small and a determining method is simple, complexity of the method is lower. In addition, no additional power overhead is required in measurement and operation processes in the method, that is, power consumption of the method is low.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer and more comprehensible, the following further describes the present disclosure in detail with reference to the accompanying drawings and embodiments. It should be understood that the embodiments described herein are merely used to explain the present disclosure but are not intended to limit the present disclosure.

The foregoing descriptions are merely exemplary embodiments of the present disclosure, but are not intended to limit the present disclosure. Any modification, equivalent replacement, and improvement made without departing from the spirit and principle of the present disclosure shall fall within the protection scope of the present disclosure.

Embodiment 1

Figure 1:
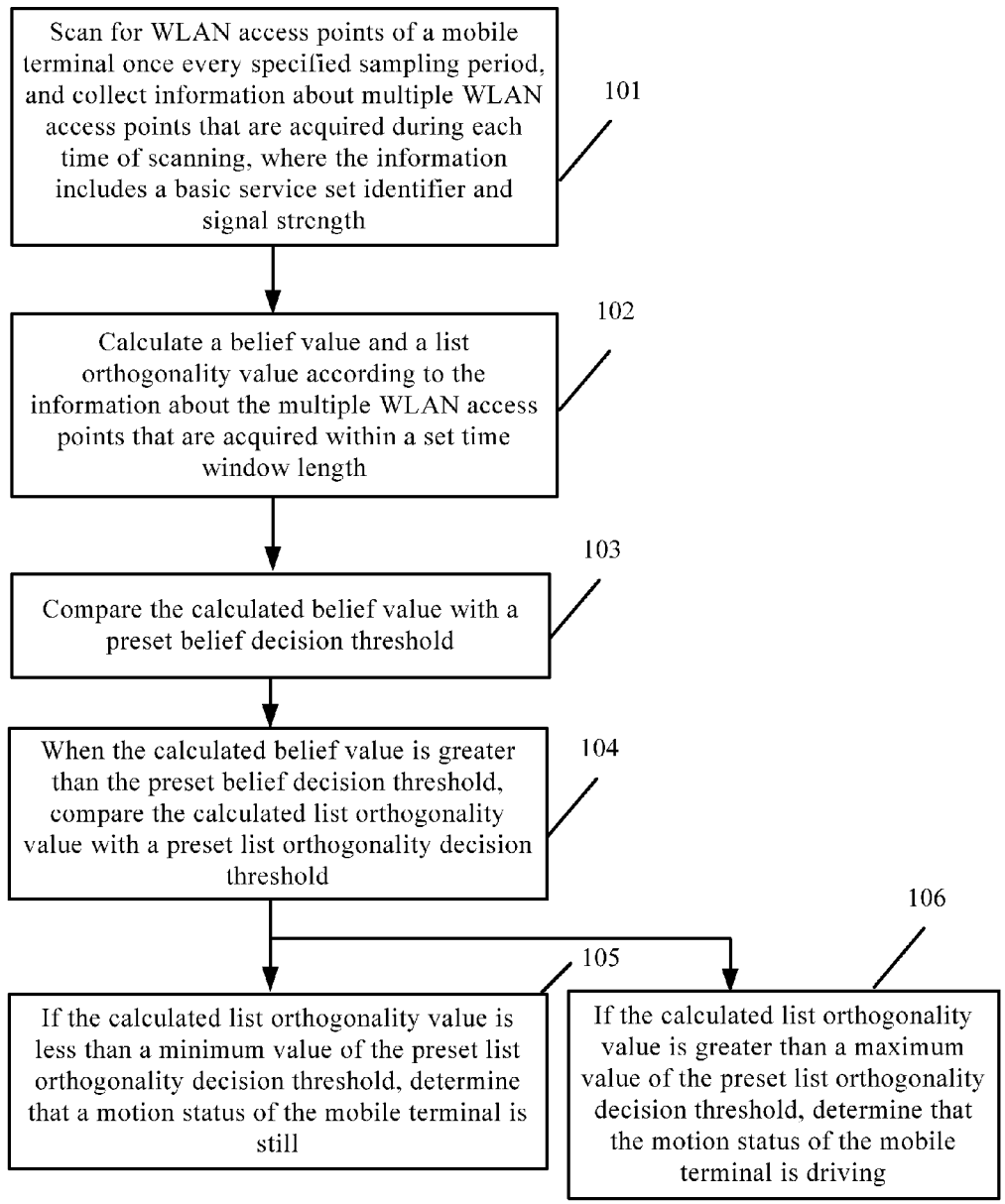
FIG. 1 is a flowchart of a method for identifying a motion status of a mobile terminal according to Embodiment 1 of the present disclosure.

FIG. 1 is a flowchart of a method for identifying a motion status of a mobile terminal according to Embodiment 1 of the present disclosure. As shown in FIG. 1, the method includes the following steps.

Step 101: Scan for WLAN access points of the mobile terminal once every specified sampling period, and collect information about multiple WLAN access points that are acquired during each time of scanning, where the information includes a basic service set identifier and signal strength.

In this step, on the premise that a WLAN function of the mobile terminal is enabled, access points (AP) are scanned for once every specified sampling period $\Delta t$, and basic service set identifiers (BSSID) and signal strength of multiple WLAN access points that are measured each time are recorded. To facilitate automatic processing of software, a result of each time of scanning may be recorded in the form of a list. For example, a form of one WLAN access point list is L={<BSSID 1, strength 1>, <BSSID 2, strength 2>, ... }, and multiple WLAN access point lists, $L_1, \ldots, L_k, L_{k+1}, \ldots$, are acquired during multiple times of scanning.

One time window length T is selected, where the length T is an integral multiple of the sampling period $\Delta t$, that is, $T=n\Delta t$. Combined analysis is performed on n WLAN access point lists, $L_{i_0}, L_{i_0+1}, \ldots,$ and $L_{i_0+n-1}$, acquired in successive times of scanning within one time window, where a smaller subscript of a list is corresponding to a list older in a time dimension. For example, $L_{i_0+n-1}$ is a result of the latest time of scanning within the set time window length, and $L_{i_0}$ is a result of the earliest historical scanning within the set time window length.

Step 102: Calculate a belief value and a list orthogonality value according to the information about the multiple WLAN access points that are acquired within a set time window length.

In this step, analysis on a WLAN access point list is separately calculating a belief value (recorded as Belief) and a list orthogonality value (recorded as Orth) that are corresponding to a current time window.

(1) Belief value: The belief value indicates an average length of WLAN access point lists within a set time window length and expressed in a formula as:

$$\text{Belief} = \sum_{i=0}^{n-1} k_i |L_{i_0+i}|,$$

$$\text{s.t.} \sum_{i=0}^{n-1} k_i = 1, 0 < k_i < 1$$

$|L_{i_0+i}|$ represents a length of the list $L_{i_0+i}$ (that is, a quantity of included access points), and $k_1$ is a weight factor. Preferably, $0<k_0 \leq k_1 \leq \ldots k_{n-1}<1$ may be set, such that an item fresher in a time dimension indicates a larger weight.

The calculating a belief value includes multiplying a quantity of multiple WLAN access points acquired during the scanning performed every specified sampling period by a preset first time dimension weight factor to calculate an average quantity of WLAN access points after each time of scanning; and adding all the average quantities of WLAN access points to acquire the belief value, where the average quantities are calculated within the set time window length.

The belief value is used to indicate credibility of a result of determining within the current time window, and can play a role in effectively filtering out a result of determining with a relatively high error probability. A feature of the belief value is related to a quantity of APs acquired in several successive times of scanning within the current time window. If an average quantity of APs is smaller, the belief value is smaller.

(2) List orthogonality value: The list orthogonality value is acquired by separately calculating orthogonality between the last list and previous (n−1) lists within a set time window length and performing weighted averaging on (n−1) items, and is expressed in a formula as:

$$\text{Orth} = \sum_{i=0}^{n-2} w_i \frac{\sum_{AP_t \notin (L_{i_0+n-1} \cap L_{i_0+i})} C(P_{AP_t})}{|L_{i_0+n-1} \cup L_{i_0+i}|},$$

$$\text{s.t.} \sum_{i=0}^{n-2} w_i = 1, 0 < w_i < 1$$

$|L_{i_0+n-1} \cup L_{i_0+i}|$ represents a quantity of all access points in $L_{i_0+n-1}$ and $L_{i_0+i}$, and a unique BSSID may be used to ensure that duplicate access points are not repeatedly counted. Preferably, $0<w_1 \leq w_2 \leq \ldots \leq w_{n-2}<1$ may be set, such that an item fresher in a time dimension indicates a larger weight.

It may be seen from the foregoing formula that the list orthogonality value is not only related to a quantity of orthogonal access points (access points that do not occur in two lists), but also related to signal strength $P_{AP_t}$. A degree-of-contribution function $C(P_{AP_t}) \in [0,1]$ is a non-decreasing function of signal strength. That is, a degree of contribution of an access point with higher signal strength to the list orthogonality value is higher. It is intuitively understood that, if a detected signal of an access point is weaker, it indicates that a mobile terminal is located at a coverage edge of the access point. In this case, sudden inexistence or existence of the signal of the access point may be easily caused due to interference by a surrounding signal, attenuation of a channel, or another reason. Therefore, compared with an orthogonal access point with lower signal strength, an orthogonal access point with higher signal strength can more strongly suggest a motion of the mobile terminal. In particular, if a factor of signal strength is not taken into consideration, that is, $C(P_{AP_t})=1$, orthogonality is simplified as:

$$\text{Orth} = 1 - \text{Corr} = 1 - \sum_{i=0}^{n-2} w_i \frac{|L_{i_0+n-1} \cap L_{i_0+i}|}{|L_{i_0+n-1} \cup L_{i_0+i}|},$$

$$\text{s.t.} \sum_{i=0}^{n-2} w_i = 1$$

$|L_{i_0+n-1} \cap L_{i_0+i}|$ represents a quantity of duplicate access points between $L_{i_0+n-1}$ and $L_{i_0+i}$.

The calculating a list orthogonality value includes comparing, within the set time window length, information about multiple WLAN access points that are acquired during the first time of scanning with information about multiple WLAN access points that are acquired during the second time of scanning to acquire information about non-duplicate WLAN access points that are acquired during the two times of scanning; acquiring, according to a preset degree-of-contribution function, a degree of contribution of signal strength of each of the non-duplicate WLAN access points to the list orthogonality value; adding degrees of contribution of all of the non-duplicate WLAN access points; multiplying a value, which is acquired by the adding, by a preset second time dimension weight factor to acquire an average degree of contribution, adding a quantity of non-duplicate WLAN access points and a quantity of duplicate WLAN access points that are acquired during the two times of scanning to acquire a quantity of WLAN access points; and dividing the average degree of contribution by the quantity of WLAN access points to acquire a list orthogonality value of the first time of scanning, where a list orthogonality value of the second time of scanning is acquired by comparing the information about the multiple WLAN access points that are acquired during the second time of scanning with information about multiple WLAN access points that are acquired during the third time of scanning, a list orthogonality value of the third time of scanning is acquired by comparing the information about the multiple WLAN access points that are acquired during the third time of scanning with information about multiple WLAN access points that are acquired during the fourth time of scanning, and so on, and a list orthogonality value of the $(N-1)^{th}$ time of scanning is acquired, assuming that in total N times of scanning are performed in the specified sampling periods within the set time window length; and adding the list orthogonality values of the first time of scanning, the second time of scanning, . . . , and the $(N-1)^{th}$ time of scanning to acquire a list orthogonality value of the N times of scanning within the set time window length.

The list orthogonality value reflects an update speed of a list of WLAN signals acquired by several adjacent times of scanning, and higher orthogonality indicates that a user may move at a higher speed. The list orthogonality value is related to a quantity of orthogonal APs in results of several successive times of scanning and related to signal strength. A larger quantity of orthogonal APs indicates a larger list orthogonality value, and higher signal strength of the orthogonal APs also indicates a larger list orthogonality value. The quantity of orthogonal APs refers to a quantity of APs that do not occur at the same time in results of two times of scanning.

Optionally, the method further includes calculating a signal fluctuation rate (recorded as Ed).

(3) Signal fluctuation rate: The signal fluctuation rate indicates a status of a change in signal strength of related access points in two adjacent lists within a set time window length, and is measured using an average Euclidean distance:

$$Ed = \sum_{i=0}^{n-2} \alpha_i \sqrt{\frac{\sum_{AP_m \in L_{i_0+n-1} \cap L_{i_0+i}} \left(P_{L_{i_0+n-1}}^{AP_m} - P_{L_{i_0+i}}^{AP_m}\right)^2}{|L_{i_0+n-1} \cap L_{i_0+i}|}},$$

s.t. $\sum_{i=0}^{n-2} \alpha_i = 1, 0 < \alpha_i < 1$ where $$\left(P_{L_{i_0+n-1}}^{AP_m} - P_{L_{i_0+i}}^{AP_m}\right)$$

represents a difference between strength of related signals from a same access point. Preferably, $0 < \alpha_1 \leq \alpha_2 \leq \ldots \leq \alpha_{n-2} < 1$ may be set, such that an item fresher in a time dimension indicates a larger weight.

A change in signal strength of an AP is determined using a value of a signal fluctuation rate. If the signal fluctuation rate is large, it may be determined that a motion status of a mobile terminal is walking or driving, and if the signal fluctuation rate is small, it may be determined that a motion status of a mobile terminal is still.

Step 103: Compare the calculated belief value with a preset belief decision threshold.

In this step, the comparing the calculated belief value with a preset belief decision threshold includes, if the calculated belief value is less than the belief decision threshold, determining that the motion status of the mobile terminal cannot be identified.

Step 104: When the calculated belief value is greater than the preset belief decision threshold, compare the calculated list orthogonality value with a preset list orthogonality decision threshold.

Step 105: If the calculated list orthogonality value is less than a minimum value of the preset list orthogonality decision threshold, determine that motion status of the mobile terminal is still.

Step 106: If the calculated list orthogonality value is greater than a maximum value of the preset list orthogonality decision threshold, determine that the motion status of the mobile terminal is driving.

Further, when the calculated belief value is greater than the preset belief decision threshold, the calculated list orthogonality value is compared with the preset list orthogonality decision threshold.

The comparing the calculated list orthogonality value with the preset list orthogonality decision threshold value includes, if the calculated list orthogonality value is less than the minimum value of the preset list orthogonality decision threshold, determining that the motion status of the mobile terminal is still.

Further, if the calculated list orthogonality value is greater than the maximum value of the list orthogonality decision threshold, it is determined that the motion status of the mobile terminal is driving.

Furthermore, if the calculated list orthogonality value is greater than the minimum value of the list orthogonality decision threshold and less than the maximum value of the list orthogonality decision threshold, the calculated signal fluctuation rate is compared with a preset signal fluctuation rate decision threshold.

The method further includes, if the calculated signal fluctuation rate is greater than the preset signal fluctuation rate decision threshold, determining that the motion status of the mobile terminal is walking; and if the calculated signal fluctuation rate is less than or equal to the preset signal fluctuation rate decision threshold, determining that the motion status of the mobile terminal is still.

Figures 2, 3:
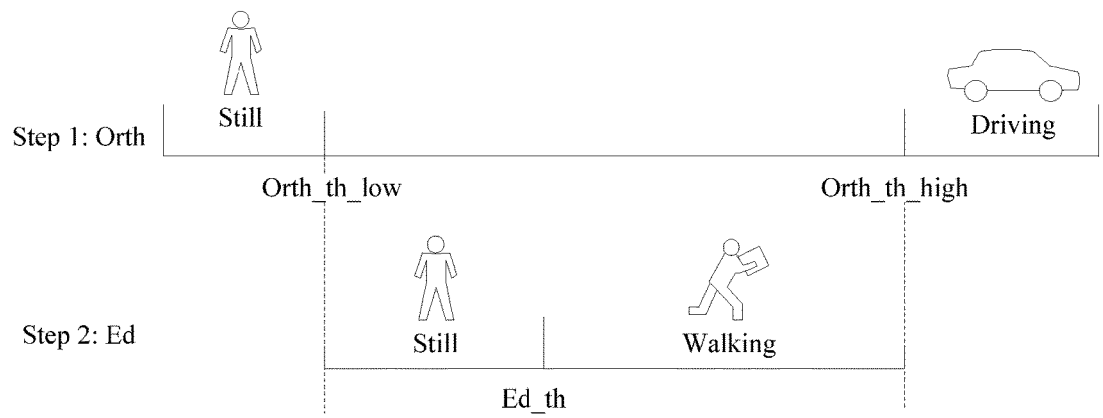
FIG. 2 is a schematic diagram of a method for identifying a motion status of a mobile terminal according to Embodiment 1 of the present disclosure.
FIG. 3 is a schematic diagram of a method for identifying a motion status of a mobile terminal within multiple time windows in a combined way according to Embodiment 1 of the present disclosure.

As shown in FIG. 2, FIG. 2 is a schematic diagram of identifying a motion status of a mobile terminal according to an embodiment of the present disclosure. As shown in FIG. 2, on the premise that a belief value is greater than a threshold, two extreme states (driving and still) in motion statuses are first distinguished using a first threshold Orth_th_low and a second threshold Orth_th_high of a list orthogonality value. For example, when a calculated list orthogonality value of the mobile terminal is less than the first threshold, it is determined that the motion status of the mobile terminal is still; and when a calculated list orthogonality value of the mobile terminal is greater than the second threshold, it is determined that the motion status of the mobile terminal is driving. For remaining situations, two gentler motion states (still and walking) are distinguished using a threshold of a signal fluctuation rate.

It should be noted that, in an actual application, in the foregoing process of determining a motion status within a current time window, calculation of three feature parameters may be performed simultaneously, thereby avoiding unwanted computational overheads and increasing a determining speed. First, a belief value is calculated. Assuming that the belief value is less than a threshold, an output is invalid directly, and two parameters, namely, a list orthogonality value and a signal fluctuation rate, do not need to be calculated; if the belief value is greater than a threshold, a list orthogonality value is calculated. Assuming that the list orthogonality value is less than a first threshold or greater than a second threshold, a corresponding output is "still" or "driving" and a signal fluctuation rate does not need to be calculated. The signal fluctuation rate needs to be calculated only when the belief value is greater than a threshold and the list orthogonality value is between the first threshold and the second threshold, and determining is performed according to a relationship between the signal fluctuation rate and the threshold.

Preferably, determining is performed according to motion statuses of the mobile terminal within several successive time windows, and a determined motion status, which occurs for most times in the motion statuses of the mobile terminal, of the mobile terminal is set as a final motion status of the mobile terminal within the several successive time windows.

As shown in FIG. 3, FIG. 3 is a schematic diagram of a method for identifying a motion status of a mobile terminal within multiple time windows in a combined way according to an embodiment of the present disclosure. To reduce erroneous determining caused by a signal jitter, combined determining may be further performed according to several successive time windows to select a motion status that occurs for most times as a final result. FIG. 3 is a schematic diagram of performing combined determining within three time windows. If a quantity of occurrences of motion statuses is more than or equal to twice in the three successive time windows, it is considered that the motion status is a final result of determining. It may be seen from FIG. 3 that determining by combining multiple time windows may effectively avoid frequent hopping.

Accompanying table 1

| Threshold parameter | Threshold value |
|---|---|
| $Belief_{th}$ | 3 |
| $Orth_{th\_low}$ | 0.2 |

-continued

Accompanying table 1

| Threshold parameter | Threshold value |
|---|---|
| $Orth_{th\_high}$ | 0.7 |
| $Ed_{th}$ | 2 |

As an embodiment, refer to accompanying table 1. First, information about WLAN access points is scanned for every $\Delta t=16$ seconds (s). It is assumed that WLAN access point lists acquired in previous three successive times of scanning are respectively:

$L_1=\{<BSSID1, -55>, <BSSID2, -73>, <BSSID3, -71>, <BSSID4, -92>\}$ $L_2=\{<BSSID2, -80>, <BSSID3, -60>, <BSSID4, -86>\}$ $L_3=\{<BSSID2, -77>, <BSSID4, -80>, <BSSID5, -70>\}$

Then, the WLAN access point lists acquired during the scanning are analyzed. If a time window length T=48 s is used, three times of scanning are included within one time window, that is, n=3. Thresholds of three features are set as shown in accompanying table 1.

Calculation of three parameters, namely, a belief value (recorded as Belief), a list orthogonality value (recorded as Orth), and a signal fluctuation rate (recorded as Ed), corresponding to a first time window (including three lists, $L_1$, $L_2$, and $L_3$) is used as an example below.

(1) Belief value: If weighted values $k_0=\frac{1}{6}$, $k_1=\frac{1}{3}$ and $k_2=\frac{1}{2}$ are used, the belief value is expressed as:

$$Belief = k_1 \cdot |L_1| + k_2 \cdot |L_2| + k_3 \cdot |L_3|$$
$$= 4/6 + 3/3 + 3/2$$
$$= 3.2 > Belief_{th}$$

(2) List orthogonality value: If weighted values $w_0=\frac{1}{3}$ and $w_1=\frac{2}{3}$ are used, a degree-of-contribution function $C(P_{AP_t})$ is defined as:

$$C(P_{AP_t}) = \begin{cases} 1, & P \geq -60 \\ 0.9, & -80 \leq P < -60 \\ 0.8, & P < -80 \end{cases}$$

Because an orthogonal access point set of $L_3$ and $L_1$ is $\{<BSSID1, -55>, <BSSID3, -71>, <BSSID5, -70>\}$, and an orthogonal access point set of $L_3$ and $L_2$ is $\{<BSSID3, -60>, <BSSID5, -70>\}$, the list orthogonality value is:

$$Orth = w_1 \frac{\sum_{AP_t \notin L_1 \cap L_3} C(P_{AP_t})}{|L_1 \cup L_3|} + w_2 \frac{\sum_{AP_t \notin L_2 \cap L_3} C(P_{AP_t})}{|L_2 \cup L_3|}$$
$$= \frac{1}{3} \cdot \frac{C(-55) + C(-71) + C(-70)}{5} + \frac{2}{3} \cdot \frac{C(-60) + C(-70)}{4}$$
$$= \frac{1}{3} \cdot \frac{1 + 0.9 + 0.9}{5} + \frac{2}{3} \cdot \frac{1 + 0.9}{4}$$

-continued $$= 0.33 \in (Orth_{th\_low}, Orth_{th\_high})$$

(3) Signal fluctuation rate: If weighted values $\alpha_0=\frac{1}{3}$ and $\alpha_1=\frac{2}{3}$ are used, the signal fluctuation rate is:

$$Ed = \frac{1}{3} \cdot \frac{\sqrt{(77-73)^2 + (92-80)^2}}{2} + \frac{2}{3} \cdot \frac{\sqrt{(80-77)^2 + (86-80)^2}}{2}$$

$$= 4.345 > Ed_{th}$$

According to a preset threshold and the foregoing three sketch value, it is inferred that the motion status within a current time window is "walking".

As another embodiment, information about WLAN access points is first scanned for every $\Delta t=16$ s. It is assumed that WLAN access point lists acquired in previous three successive times of scanning are respectively:

$$L_1 = \{<BSSID1, -60>, <BSSID2, -76>, <BSSID3, -84>, <BSSID4, -88>\}$$

$$L_2 = \{<BSSID2, -77>, <BSSID3, -88>\}$$

$$L_3 = \{<BSSID2, -77>, <BSSID5, -70>, <BSSID6, -90>, <BSSID7, -93>\}$$

In the same way, a time window length T=48 s is used, that is, n=3. The following shows feature calculation and determining processes. A value in accompanying table 1 is still used as a threshold.

(1) Belief value: If weighted values $k_0=\frac{1}{6}$, $k_1=\frac{1}{3}$ and $k_2=\frac{1}{2}$ are used, the belief value is expressed as:

$$Belief = k_1 \cdot |L_1| + k_2 \cdot |L_2| + k_3 \cdot |L_3|$$

$$= 4/6 + 2/3 + 4/2$$

$$= 3.33 > Belief_{th}$$

(2) List orthogonality value: If weighted values $w_0=\frac{1}{3}$ and $w_1=\frac{2}{3}$ are used, and a degree-of-contribution function $C(P_{AP_i})=1$ is used, the list orthogonality value is:

$$Orth = 1 - Corr$$

$$= 1 - \left( w_0 \frac{|L_1 \cap L_3|}{|L_1 \cup L_3|} + w_1 \frac{|L_2 \cap L_3|}{|L_2 \cup L_3|} \right)$$

$$= 1 - \left( \frac{1}{3} \cdot \frac{1}{7} + \frac{2}{3} \cdot \frac{1}{5} \right)$$

$$= 0.822 > Orth_{th\_high}$$

Therefore, the motion status within a current time window is "driving".

This embodiment of the present disclosure provides a method for identifying a motion status of a mobile terminal using a WLAN signal to perform determining. A time window length is set, and the multiple WLAN access points acquired within the set time window length are collected, such that an application scope of the method is wide, that is, the method is applicable to an area covered by multiple WLAN access points and is not limited by an indoor or outdoor site. According to the method, a calculation process is simple, that is, the motion status of the mobile terminal may be determined simply by calculating a belief value and a list orthogonality value of the multiple WLAN access points, comparing the calculated belief value with a preset belief value, and comparing the calculated list orthogonality value with a preset list orthogonality value. Therefore, implementability of the method is high and the method may be directly applied to a mobile terminal having a WLAN function in the market without making a change in hardware. Because the method has no special requirement on a placement location of the mobile terminal during measurement and is irrelevant to a posture or a motion habit of a user, the method is universal. Because a quantity of feature parameters required in the method is small and a determining method is simple, complexity of the method is lower. In addition, no additional power overhead is required in measurement and operation processes in the method, that is, power consumption of the method is low.

Embodiment 2

Figure 4:
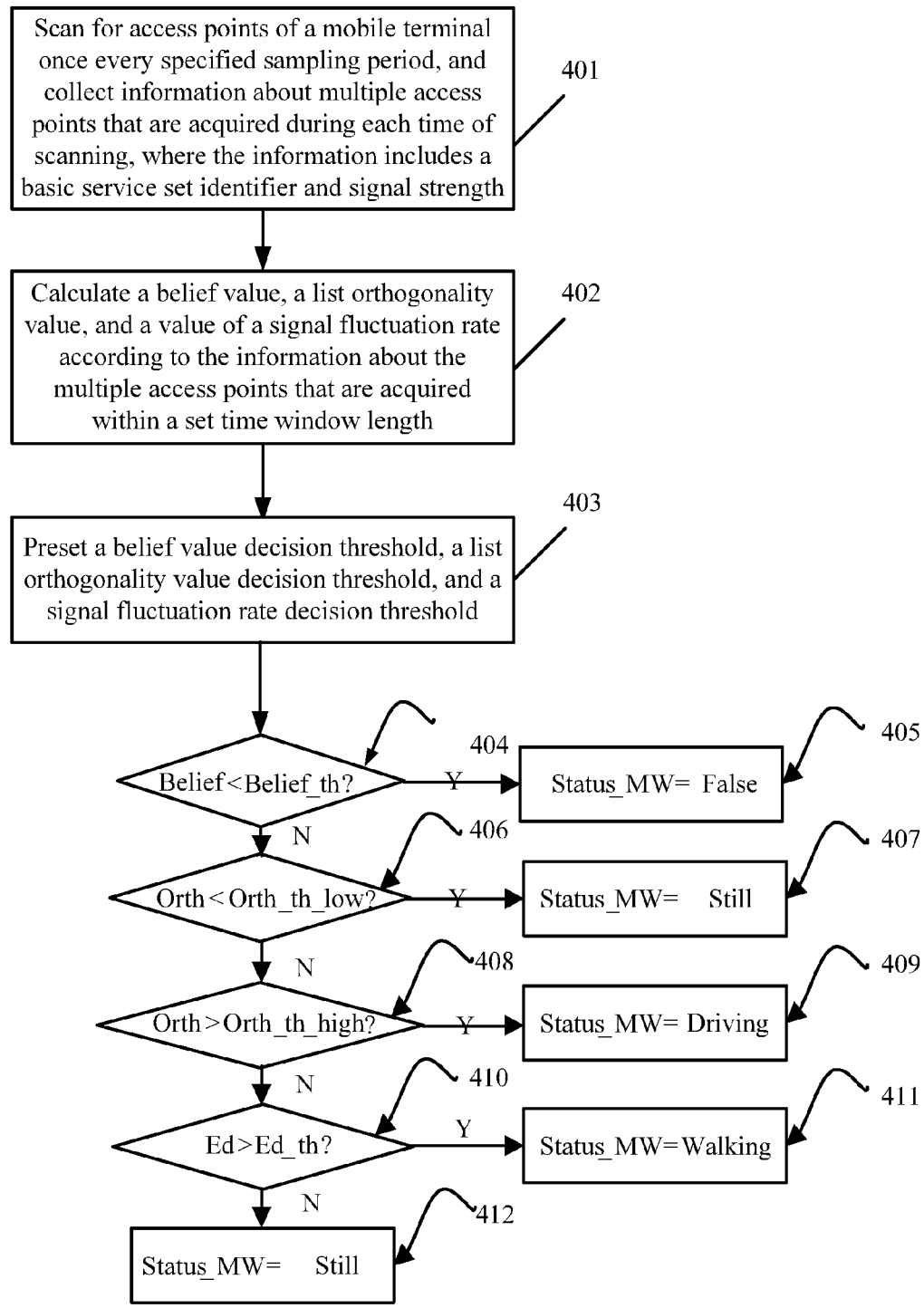
FIG. 4 is a flowchart of another method for identifying a motion status of a mobile terminal according to Embodiment 2 of the present disclosure.

FIG. 4 is a flowchart of another method for identifying a motion status of a mobile terminal according to Embodiment 2 of the present disclosure. As shown in FIG. 4, the method includes the following steps.

Step 401: Scan for WLAN access points of the mobile terminal once every specified sampling period, and collect information about multiple WLAN access points that are acquired during each time of scanning, where the information includes a basic service set identifier and signal strength.

In this step, on the premise that a WLAN function of the mobile terminal is enabled, APs are scanned for once every specified sampling period $\Delta t$, and BSSIDs and signal strength of multiple WLAN access points that are measured each time are recorded. To facilitate automatic processing of software, a result of each time of scanning may be recorded in the form of a list. For example, a form of one WLAN access point list is $L=\{<BSSID 1, strength 1>, <BSSID 2, strength 2>, \ldots\}$, and multiple WLAN access point lists, $L_1, \ldots, L_k, L_{k+1}, \ldots$, are acquired during multiple times of scanning.

One time window length T is selected, where the length T is an integral multiple of the sampling period $\Delta t$, that is, $T=n\Delta t$. Combined analysis is performed on n WLAN access point lists, $Li_0, Li_{0+1}, \ldots$, and $Li_{0+n-1}$, acquired in successive times of scanning within one time window, where a smaller subscript of a list is corresponding to a list older in a time dimension. For example, $Li_{0+n-1}$ is a result of the latest time of scanning within the set time window length, and $Li_0$ is a result of the earliest historical scanning within the set time window length.

Step 402: Calculate a belief value, a list orthogonality value, and a signal fluctuation rate according to the information about the multiple WLAN access points that are acquired within a preset time window length.

In this step, analysis on a WLAN access point list is separately calculating three parameters, namely, a belief value (recorded as Belief), a list orthogonality value (recorded as Orth), and a signal fluctuation rate (recorded as Ed), corresponding to a current time window.

(1) Belief value: The belief value indicates an average length of WLAN access point lists within a set time window length and is expressed in a formula as:

$$Belief = \sum_{i=0}^{n-1} k_i |L_{i_0+i}|,$$

-continued $$\text{s.t.} \sum_{i=0}^{n-1} k_i = 1, 0 < k_i < 1$$

$|L_{i_0+i}|$ represents a length of the list $L_{i_0+i}$ (that is, a quantity of included access points), and $k_i$ is a weight factor. Preferably, $0 < k_0 \le k_1 \le \ldots k_{n-1} < 1$ may be set, such that an item fresher in a time dimension indicates a larger weight.

The calculating a belief value includes multiplying a quantity of multiple WLAN access points acquired during the scanning performed every specified sampling period by a preset first time dimension weight factor to calculate an average quantity of WLAN access points after each time of scanning; and adding all the average quantities of WLAN access points, wherein the average quantities are calculated within the set time window length.

(2) List orthogonality value: The list orthogonality value is acquired by separately calculating orthogonality between the last list and previous (n−1) lists within a set time window length and performing weighted averaging on (n−1) items, and is expressed in a formula as:

$$Orth = \sum_{i=0}^{n-2} w_i \frac{\sum_{AP_t \notin (L_{i_0+n-1} \cap L_{i_0+i})} C(P_{AP_t})}{|L_{i_0+n-1} \cup L_{i_0+i}|},$$

$$\text{s.t.} \sum_{i=0}^{n-2} w_i = 1, 0 < w_i < 1$$

$|L_{i_0+n-1} \cup L_{i_0+i}|$ represents a quantity of all access points in $L_{i_0+n-1}$ and $L_{i_{hd}+i}$, and a unique BSSID may be used to ensure that duplicate access points are not repeatedly counted. Preferably, $0 < w_1 \le w_2 \le \ldots, \le w_{n-2} < 1$ may be set, such that an item fresher in a time dimension indicates a larger weight.

It may be seen from the foregoing formula that the list orthogonality value is not only related to a quantity of orthogonal access points (access points that do not occur in two lists at the same time), but also related to signal strength $P_{AP_t}$. A degree-of-contribution function $C(P_{AP_t}) \in [0,1]$ is a non-decreasing function of signal strength. That is, a degree of contribution of an access point with higher signal strength to the list orthogonality value is higher. It is intuitively understood that, if a detected signal of an access point is weaker, it indicates that a mobile terminal is located at a coverage edge of the access point. In this case, sudden inexistence or existence of the signal of the access point may be easily caused due to interference by a surrounding signal, attenuation of a channel, or another reason. Therefore, compared with an orthogonal access point with lower signal strength, an orthogonal access point with higher signal strength can more strongly suggest a motion of the mobile terminal. In particular, if a factor of signal strength is not taken into consideration, that is, $C(P_{AP_t})=1$, orthogonality is simplified as:

$$Orth = 1 - Corr = 1 - \sum_{i=0}^{n-2} w_i \frac{|L_{i_0+n-1} \cap L_{i_0+i}|}{|L_{i_0+n-1} \cup L_{i_0+i}|},$$

$$\text{s.t.} \sum_{i=0}^{n-2} w_i = 1$$

$|L_{i_0+n-1} \cap L_{i_0+i}|$ represents a quantity of duplicate access points between $L_{i_0+n-1}$ and $L_{i_0+i}$.

The calculating a list orthogonality value includes presetting a degree-of-contribution function, where the degree-of-contribution function is a non-decreasing function of signal strength and indicates that a degree of contribution of a WLAN access point with higher signal strength to the list orthogonality value is higher; comparing, within the set time window length, information about multiple WLAN access points that are acquired during the first time of scanning with information about multiple WLAN access points that are acquired during the second time of scanning to acquire information about non-duplicate WLAN access points that are acquired during the two times of scanning; acquiring, according to the degree-of-contribution function, a degree of contribution of signal strength of each of the non-duplicate WLAN access points to the list orthogonality value; adding degrees of contribution of all of the non-duplicate WLAN access points; multiplying a value, which is acquired by the adding, by a preset second time dimension weight factor to acquire an average degree of contribution; adding a quantity of non-duplicate WLAN access points and a quantity of duplicate WLAN access points that are acquired during the two times of scanning to acquire a quantity of WLAN access points; and dividing the average degree of contribution by the quantity of WLAN access points to acquire a list orthogonality value of the first time of scanning. A list orthogonality value of the second time of scanning is acquired by comparing the information about the multiple WLAN access points that are acquired during the second time of scanning with information about multiple WLAN access points that are acquired during the third time of scanning, a list orthogonality value of the third time of scanning is acquired by comparing the information about the multiple WLAN access points that are acquired during the third time of scanning with information about multiple WLAN access points that are acquired during the fourth time of scanning, and so on, and a list orthogonality value of the $(N-1)^{th}$ time of scanning is acquired, assuming that total N times of scanning are performed in the specified sampling periods within the set time window length; and adding the list orthogonality values of the first time of scanning, the second time of scanning, . . . , and the $(N-1)^{th}$ time of scanning to acquire a list orthogonality value of the N times of scanning within the set time window length.

(3) Signal fluctuation rate: The signal fluctuation rate indicates a status of a change in signal strength of related access points in two adjacent lists within a set time window length, and is measured using an average Euclidean distance:

$$Ed = \sum_{i=0}^{n-2} \alpha_i \sqrt{\frac{\sum_{AP_m \in L_{i_0+n-1} \cap L_{i_0+i}} (P_{L_{i_0+n-1}}^{AP_m} - P_{L_{i_0+i}}^{AP_m})^2}{|L_{i_0+n-1} \cap L_{i_0+i}|}},$$

$$\text{s.t.} \sum_{i=0}^{n-2} \alpha_i = 1, 0 < \alpha_i < 1$$

where $$\left(P^{AP_m}_{L_{i_0+n-1}} - P^{AP_m}_{L_{i_0+i}}\right)$$

represents a difference between strength of related signals from a same access point. Preferably, $0<\alpha_1 \leq \alpha_2 \leq \ldots \leq \alpha_{n-2}<1$ may be set, such that an item fresher in a time dimension indicates a larger weight.

Step 403: Preset a belief decision threshold, a list orthogonality decision threshold, and a signal fluctuation rate decision threshold.

Step 404: Determine whether the belief value is less than the belief decision threshold. If the belief value is less than the belief decision threshold, proceed to step 405. If the belief value is not less than the belief decision threshold, perform step 406.

Step 405: If the belief value is less than the preset belief decision threshold, it is considered that APs are too sparse, and therefore, an output result is invalid.

Step 406: Determine whether the list orthogonality value is less than a first list orthogonality decision threshold. If the list orthogonality value is less than the first list orthogonality decision threshold, proceed to step 407, and if the list orthogonality value is not less than the first list orthogonality decision threshold, perform step 408.

Step 407: If the list orthogonality value is less than the first list orthogonality decision threshold, determine that the current motion status of the mobile terminal is still.

Step 408: Determine whether the list orthogonality value is greater than a second list orthogonality decision threshold. If the list orthogonality value is greater than the second list orthogonality decision threshold, proceed to step 409, and if the list orthogonality value is not greater than the second list orthogonality decision threshold, perform step 410.

Step 409: If the list orthogonality value is greater than the second list orthogonality decision threshold, determine that the current motion status of the mobile terminal is driving.

Step 410: Determine whether the signal fluctuation rate is greater than a signal fluctuation rate value threshold. If the signal fluctuation rate is greater than the signal fluctuation rate value threshold, proceed to step 411, and if the signal fluctuation rate is not greater than the signal fluctuation rate value threshold, perform step 412.

Step 411: If the signal fluctuation rate is greater than the signal fluctuation rate value threshold, determine that the current motion status of the mobile terminal is walking.

Step 412: If the signal fluctuation rate is less than or equal to the signal fluctuation rate value threshold, determine that the current motion status of the mobile terminal is still.

This embodiment of the present disclosure provides a method for identifying a motion status of a mobile terminal using a WLAN signal to perform determining. A time window length is set, and the multiple WLAN access points acquired within the set time window length are collected, such that an application scope of the method is wide, that is, the method is applicable to an area covered by multiple WLAN access points and is not limited by an indoor or outdoor site. According to the method, a calculation process is simple, that is, the motion status of the mobile terminal may be determined simply by calculating a belief value, a list orthogonality value, and a signal fluctuation rate of the multiple WLAN access points, comparing the calculated belief value with a preset belief value, comparing the calculated list orthogonality value with a preset list orthogonality value, and comparing the calculated signal fluctuation rate with a preset signal fluctuation rate. Therefore, implementability of the method is high and the method may be directly applied to a mobile terminal having a WLAN function in the market without making a change in hardware. Because the method has no special requirement on a placement location of the mobile terminal during measurement and is irrelevant to a posture or a motion habit of a user, the method is universal. Because a quantity of feature parameters required in the method is small and a determining method is simple, complexity of the method is lower. In addition, no additional power overhead is required in measurement and operation processes in the method, that is, power consumption of the method is low.

Embodiment 3

Figure 5:
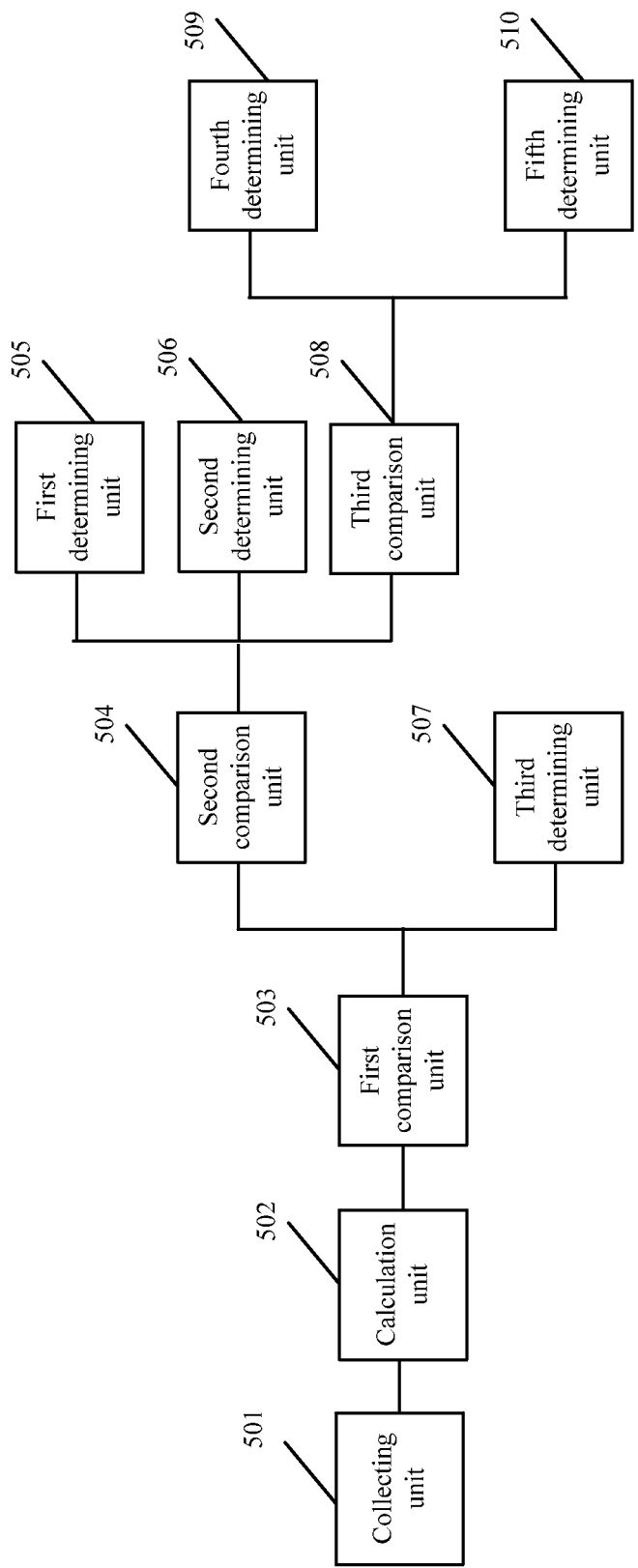
FIG. 5 is a structural diagram of an apparatus of a mobile terminal according to Embodiment 3 of the present disclosure.

FIG. 5 is a structural diagram of an apparatus of a mobile terminal according to Embodiment 3 of the present disclosure. As shown in FIG. 5, the mobile terminal includes the following units.

A collecting unit 501 is configured to scan for WLAN access points of the mobile terminal once every specified sampling period, and collect information about multiple WLAN access points that are acquired during each time of scanning, where the information includes a basic service set identifier and signal strength.

According to this unit, on the premise that a WLAN function of the mobile terminal is enabled, APs are scanned for once every specified sampling period $\Delta t$, and BSSIDs and signal strength of multiple WLAN access points that are measured each time are recorded. To facilitate automatic processing of software, a result of each time of scanning may be recorded in the form of a list. For example, a form of one WLAN access point list is L={<BSSID 1, strength 1>, <BSSID 2, strength 2>, . . . }, and multiple WLAN access point lists, $L_1, \ldots, L_k, L_{k+1}, \ldots$, are acquired during multiple times of scanning.

One time window length T is selected, where the length T is an integral multiple of the sampling period $\Delta t$, that is, $T=n\Delta t$. Combined analysis is performed on n WLAN access point lists, $L_{i_0}, L_{i+1}, \ldots$, and $L_{i_0+n-1}$, acquired in successive times of scanning within one time window, where a smaller subscript of a list is corresponding to a list older in a time dimension. For example, $L_{i_0+n-1}$ is a result of the latest time of scanning within the set time window length, and $L_{i_0}$ is a result of the earliest historical scanning within the set time window length.

A calculation unit 502 is configured to calculate a belief value and a list orthogonality value according to the information about the multiple WLAN access points that are acquired within a set time window length.

According to this unit, analysis on a WLAN access point list is separately calculating a belief value (recorded as Belief) and a list orthogonality value (recorded as Orth) that are corresponding to a current time window.

(1) Belief value: The belief value indicates an average length of WLAN access point lists within a set time window length and is expressed in a formula as:

$$\text{Belief} = \sum_{i=0}^{n-1} k_i |L_{i_0+i}|,$$

-continued $$\text{s.t.} \sum_{i=0}^{n-1} k_i = 1, 0 < k_i < 1$$

$|L_{i_0+i}|$ represents a length of the list $L_{i_0+i}$ (that is, a quantity of included access points), and $k_i$ is a weight factor. Preferably, $0<k_0 \leq k_1 \leq \ldots k_{n-1}<1$ may be set, such that an item fresher in a time dimension indicates a larger weight.

The step of calculating the belief value by the calculation unit includes multiplying a quantity of multiple WLAN access points acquired during the scanning performed every specified sampling period by a preset first time dimension weight factor to calculate an average quantity of WLAN access points after each time of scanning; and adding all the average quantities of WLAN access points, where the average quantities are calculated within the set time window length.

(2) List orthogonality value: The list orthogonality value is acquired by separately calculating orthogonality between the last list and previous (n−1) lists within a set time window length and performing weighted averaging on (n−1) items, and is expressed in a formula as:

$$Orth = \sum_{i=0}^{n-2} w_i \frac{\sum_{AP_t \notin (L_{i_0+n-1} \cap L_{i_0+i})} C(P_{AP_t})}{|L_{i_0+n-1} \cup L_{i_0+i}|},$$

$$\text{s.t.} \sum_{i=0}^{n-2} w_i = 1, 0 < w_i < 1$$

$|L_{i_0+n-1} \cup L_{i_0+i}|$ represents a quantity of all access points in $L_{i_0+n-1}$ and $L_{i_0+i}$, and a unique BSSID may be used to ensure that duplicate access points are not repeatedly counted. Preferably, $0<w_1 \leq w_2 \leq \ldots \leq w_{n-2}<1$ may be set, such that an item fresher in a time dimension indicates a larger weight.

It may be seen from the foregoing formula that the list orthogonality value is not only related to a quantity of orthogonal access points (access points that do not occur in two lists at the same time), but also related to signal strength $P_{AP_t}$. A degree-of-contribution function $C(P_{AP_t}) \in [0,1]$ is a non-decreasing function of signal strength. That is, a degree of contribution of an access point with higher signal strength to the list orthogonality value is higher. It is intuitively understood that, if a detected signal of an access point is weaker, it indicates that a mobile terminal is being located at a coverage edge of the access point. In this case, sudden inexistence or existence of the signal of the access point may be easily caused due to interference by a surrounding signal, attenuation of a channel, or another reason. Therefore, compared with an orthogonal access point with lower signal strength, an orthogonal access point with higher signal strength can more strongly suggest a motion of the mobile terminal. In particular, if a factor of signal strength is not taken into consideration, that is, $C(P_{AP_t})=1$, orthogonality is simplified as:

$$Orth = 1 - Corr = 1 - \sum_{i=0}^{n-2} w_i \frac{|L_{i_0+n-1} \cap L_{i_0+i}|}{|L_{i_0+n-1} \cup L_{i_0+i}|},$$

-continued $$\text{s.t.} \sum_{i=0}^{n-2} w_i = 1$$

$|L_{i_0+n-1} \cap L_{i_0+i}|$ represents a quantity of duplicate access points between $L_{i_0+n-1}$ and $L_{i_0+i}$.

The step of calculating the list orthogonality value by the calculation unit includes presetting a degree-of-contribution function, where the degree-of-contribution function is a non-decreasing function of signal strength and shows that a degree of contribution of a WLAN access point with higher signal strength to the list orthogonality value is higher; comparing, within the set time window length, information about multiple WLAN access points that are acquired during the first time of scanning with information about multiple WLAN access points that are acquired during the second time of scanning to acquire information about non-duplicate WLAN access points that are acquired during the two times of scanning; acquiring, according to the degree-of-contribution function, a degree of contribution of signal strength of each of the non-duplicate WLAN access points to the list orthogonality value; adding degrees of contribution of all of the non-duplicate WLAN access points; multiplying a value, which is acquired by the adding, by a preset second time dimension weight factor to acquire an average degree of contribution; adding a quantity of non-duplicate WLAN access points and a quantity of duplicate WLAN access points that are acquired during the two times of scanning to acquire a quantity of WLAN access points; and dividing the average degree of contribution by the quantity of WLAN access points to acquire a list orthogonality value of the first time of scanning, where a list orthogonality value of the second time of scanning is acquired by comparing the information about the multiple WLAN access points that are acquired during the second time of scanning with information about multiple WLAN access points that are acquired during the third time of scanning, a list orthogonality value of the third time of scanning is acquired by comparing the information about the multiple WLAN access points that are acquired during the third time of scanning with information about multiple WLAN access points that are acquired during the fourth time of scanning, and so on, and a list orthogonality value of the $(N-1)^{th}$ time of scanning is acquired, assuming that in total N times of scanning are performed in the specified sampling periods within the set time window length; and adding the list orthogonality values of the first time of scanning, the second time of scanning, . . . , and the $(N-1)^{th}$ time of scanning to acquire a list orthogonality value of the N times of scanning within the set time window length.

Optionally, the calculation unit further includes a calculation subunit, where the calculation subunit is configured to calculate a signal fluctuation rate.

(3) Signal fluctuation rate: The signal fluctuation rate indicates a situation of a change in signal strength of related access points in two adjacent lists within a set time window length, and is measured using an average Euclidean distance:

$$Ed = \sum_{i=0}^{n-2} \alpha_i \sqrt{\frac{\sum_{AP_m \in L_{i_0+n-1} \cap L_{i_0+i}} (P^{AP_m}_{L_{i_0+n-1}} - P^{AP_m}_{L_{i_0+i}})^2}{|L_{i_0+n-1} \cap L_{i_0+i}|}},$$

-continued $$\text{s.t.} \sum_{i=0}^{n-2} \alpha_i = 1, 0 < \alpha_i < 1$$

where $$\left(P_{L_{i_0+n-1}}^{AP_m} - P_{L_{i_0+i}}^{AP_m}\right)$$

represents a difference between strength of related signals from a same access point. Preferably, $0<\alpha_1 \leq \alpha_2 \leq \ldots \leq \alpha_{n-2}<1$ may be set, such that an item fresher in a time dimension indicates a larger weight.

A first comparison unit 503 is configured to compare the calculated belief value with a preset belief decision threshold.

The mobile terminal further includes a third determining unit 507, where the third determining unit 507 is configured to, if the calculated belief value is less than the preset belief decision threshold, determine that a motion status of the mobile terminal cannot be identified.

A second comparison unit 504 is configured to, when the calculated belief value is greater than the preset belief decision threshold, compare the calculated list orthogonality value with a preset list orthogonality decision threshold.

A first determining unit 505 is configured to, if the calculated list orthogonality value is less than a minimum value of the preset list orthogonality decision threshold, determine that motion status of the mobile terminal is still.

A second determining unit 506 is configured to, if the calculated list orthogonality value is greater than a maximum value of the preset list orthogonality decision threshold, determine that the motion status of the mobile terminal is driving.

The mobile terminal further includes a calculation subunit, where the calculation subunit is configured to calculate a signal fluctuation rate according to the information about the multiple WLAN access points that are acquired within the set time window length.

The mobile terminal further includes a third comparison unit 508, where the third comparison unit 508 is configured to, if the calculated list orthogonality value is greater than the minimum value of the preset list orthogonality decision threshold and less than the maximum value of the list orthogonality decision threshold, compare the calculated signal fluctuation rate with a preset signal fluctuation rate decision threshold.

The mobile terminal further includes a fourth determining unit 509 and a fifth determining unit 510.

The fourth determining unit 509 is configured to, if the calculated signal fluctuation rate is greater than the preset signal fluctuation rate decision threshold, determine that the motion status of the mobile terminal is walking.

The fifth determining unit 510 is configured to, if the calculated signal fluctuation rate is less than or equal to the preset signal fluctuation rate decision threshold, determine that the motion status of the mobile terminal is still.

The mobile terminal further includes a processing unit, where the processing unit is configured to perform determining according to motion statuses of the mobile terminal within several successive time windows, and set a determined motion status, which occurs for most times in the motion statuses of the mobile terminal, of the mobile terminal as a final motion status of the mobile terminal within the several successive time windows.

This embodiment of the present disclosure provides a mobile terminal. The mobile terminal sets a time window length and collects the multiple WLAN access points acquired within the set time window length, such that an application scope of the mobile terminal is wide, that is, the method is applicable to an area covered by multiple WLAN access points and is not limited by an indoor or outdoor site. According to the method, a calculation process is simple, that is, the motion status of the mobile terminal may be determined simply by calculating a belief value and a list orthogonality value of the multiple WLAN access points, comparing the calculated belief value with a preset belief value, and comparing the calculated list orthogonality value with a preset list orthogonality value. Therefore, implementability of the method is high and the method may be directly applied to a mobile terminal having a WLAN function in the market without making a change in hardware. Because the method has no special requirement on a placement location of the mobile terminal during measurement and is irrelevant to a posture or a motion habit of a user, the method is universal. Because a quantity of feature parameters required in the method is small and a determining method is simple, complexity of the method is lower. In addition, no additional power overhead is required in measurement and operation processes in the method, that is, power consumption of the method is low.

Embodiment 4

Figure 6:
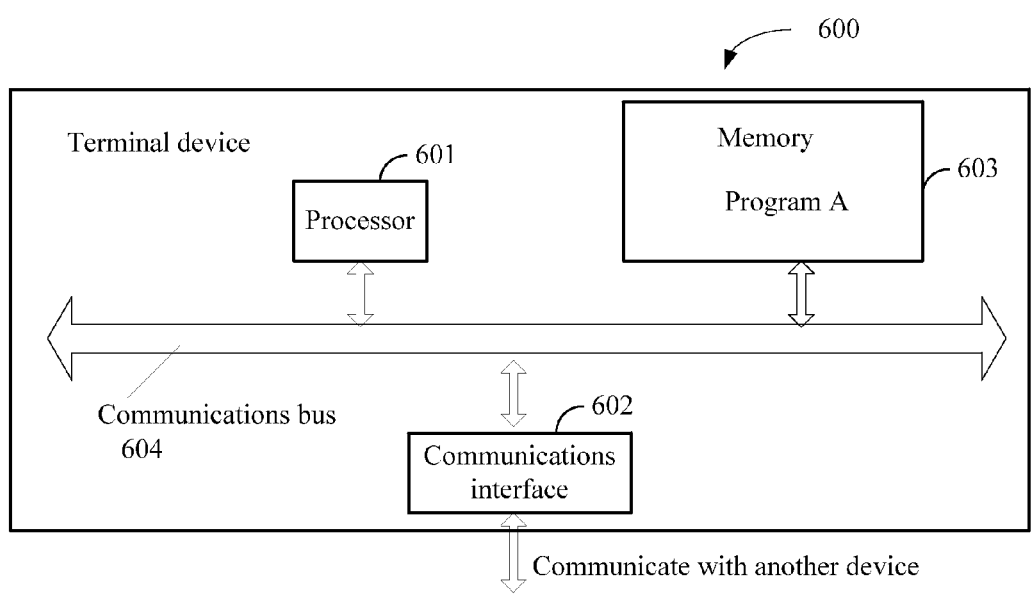
FIG. 6 is a structural diagram of an apparatus of a mobile terminal according to Embodiment 4 of the present disclosure.

FIG. 6 is a structural diagram of an apparatus of a mobile terminal according to Embodiment 4 of the present disclosure. Referring to FIG. 6, FIG. 6 is a mobile terminal 600 according to an embodiment of the present disclosure, and no limitation is imposed on implementation of the mobile terminal in the embodiment of the present disclosure. The mobile terminal 600 includes a processor 601, a communications interface 602, a memory 603, and a bus 604.

The processor 601, the communications interface 602, and the memory 603 accomplish mutual communication using the bus 604.

The communications interface 602 is configured to communicate with another device.

The processor 601 is configured to execute an application.

The application may include program code, where the program code includes computer operation instructions.

The processor 601 may be a central processing unit (CPU), or an application specific integrated circuit (ASIC), or one or more integrated circuits configured to implement this embodiment of the present disclosure.

The memory 603 is configured to store the application. The memory 603 may include a high-speed random access memory (RAM), or may include a non-volatile memory, for example, at least one magnetic disk memory. The application may include scanning for WLAN access points of the mobile terminal once every specified sampling period, and collecting information about multiple WLAN access points that are acquired during each time of scanning, where the information includes a basic service set identifier and signal strength; calculating a belief value and a list orthogonality value according to the information about the multiple WLAN access points that are acquired within a set time window length; comparing the calculated belief value with a preset belief decision threshold; when the calculated belief value is greater than the preset belief decision threshold, comparing the calculated list orthogonality value with a preset list orthogonality decision threshold; if the calculated list orthogonality value is less than a minimum value of the preset list orthogonality decision threshold, determining that motion status of the mobile terminal is still; and if the calculated list orthogonality value is greater than a maximum value of the preset list orthogonality decision threshold, determining that motion status of the mobile terminal is driving.

The calculating a belief value includes multiplying a quantity of multiple WLAN access points acquired in the scanning performed every specified sampling period by a preset first time dimension weight factor to calculate an average quantity of WLAN access points after each time of scanning; and adding all the average quantities and of WLAN access points to acquire the belief value, where the average quantities are calculated within the set time window length.

The calculating a list orthogonality value includes comparing, within the set time window length, information about multiple WLAN access points that are acquired during the first time of scanning with information about multiple WLAN access points that are acquired during the second time of scanning to acquire information about non-duplicate WLAN access points that are acquired during the two times of scanning; acquiring, according to a preset degree-of-contribution function, a degree of contribution of signal strength of each of the non-duplicate WLAN access points to the list orthogonality value; adding degrees of contribution of all of the non-duplicate WLAN access points; multiplying a value, which is acquired by the adding, by a preset second time dimension weight factor to acquire an average degree of contribution; adding a quantity of non-duplicate WLAN access points and a quantity of duplicate WLAN access points that are acquired during the two times of scanning to acquire a quantity of WLAN access points; and dividing the average degree of contribution by the quantity of WLAN access points to acquire a list orthogonality value of the first time of scanning, where a list orthogonality value of the second time of scanning is acquired by comparing the information about the multiple WLAN access points that are acquired during the second time of scanning with information about multiple WLAN access points that are acquired during the third time of scanning, a list orthogonality value of the third time of scanning is acquired by comparing the information about the multiple WLAN access points that are acquired during the third time of scanning with information about multiple WLAN access points that are acquired during the fourth time of scanning, and so on, and a list orthogonality value of the $(N-1)^{th}$ time of scanning is acquired, assuming that in total N times of scanning are performed in the specified sampling periods within the set time window length; and adding the list orthogonality values of the first time of scanning, the second time of scanning, . . . , and the $(N-1)^{th}$ time of scanning to acquire a list orthogonality value of the N times of scanning within the set time window length.

The application further includes, if the calculated belief value is less than the preset belief decision threshold, determining that motion status of the mobile terminal cannot be identified.

The application further includes calculating a signal fluctuation rate according to the information about the multiple WLAN access points that are acquired within the set time window length, and if the calculated list orthogonality value is greater than the minimum value of the preset list orthogonality decision threshold and less than the maximum value of the list orthogonality decision threshold, comparing the calculated signal fluctuation rate with a preset signal fluctuation rate decision threshold.

The application further includes, if the calculated signal fluctuation rate is greater than the preset signal fluctuation rate decision threshold, determining that motion status of the mobile terminal is walking; and if the calculated signal fluctuation rate is less than or equal to the preset signal fluctuation rate decision threshold, determining that motion status of the mobile terminal is still.

The application further includes performing determining according to motion statuses of the mobile terminal within several successive time windows, and setting a determined motion status, which occurs for most times in the motion statuses of the mobile terminal, of the mobile terminal as a final motion status of the mobile terminal within the several successive time windows.

A person of ordinary skill in the art may understand that all or some of the processes of the methods in the embodiments may be implemented by a computer program instructing relevant hardware, such as a processor. The program may be stored in a computer readable storage medium. When the program runs, the processes of the methods in the embodiments are performed. The foregoing storage medium may include a magnetic disk, an optical disc, a read-only memory (ROM), or a RAM.

The foregoing descriptions are merely preferred implementation manners of the present disclosure, but are not intended to limit the protection scope of the present disclosure. Any modification, equivalent replacement, and improvement made without departing from the spirit and principle of the present disclosure shall fall within the protection scope of the present disclosure.

What is claimed is:

1. A method for identifying a motion status of a mobile terminal, the method comprising:
   scanning for wireless local area network (WLAN) access points of the mobile terminal once every specified sampling period;
   collecting information about multiple WLAN access points that are acquired during each time of scanning, wherein the information comprises a basic service set identifier and signal strength;
   calculating a belief value and a list orthogonality value according to the information about the multiple WLAN access points that are acquired within a set time window length, wherein the set time window length is n sampling period, wherein n is an integral multiple, wherein the belief value is an average length of WLAN access point lists within the set time window length, and wherein the list orthogonality value is a weighted average of (n−1) orthogonalities that are acquired by separately calculating orthogonality between the last list and previous (n−1) lists within the time window;
   comparing the calculated belief value with a preset belief decision threshold;
   comparing the calculated list orthogonality value with a preset list orthogonality decision threshold when the calculated belief value is greater than the preset belief decision threshold;
   determining that the motion status of the mobile terminal is still when the calculated list orthogonality value is less than a minimum value of the preset list orthogonality decision threshold; and
   determining that the motion status of the mobile terminal is driving when the calculated list orthogonality value is greater than a maximum value of the preset list orthogonality decision threshold.

2. The method according to claim 1, wherein calculating the belief value comprises:
multiplying a quantity of multiple WLAN access points acquired during the scanning performed every specified sampling period by a preset first time dimension weight factor to calculate an average quantity of WLAN access points after each time of scanning; and
adding all the average quantities of WLAN access points to acquire the belief value, wherein the average quantities are calculated within the set time window length.

3. The method according to claim 1, wherein calculating the list orthogonality value comprises:
comparing, within the set time window length, information about multiple WLAN access points that are acquired during the first time of scanning with information about multiple WLAN access points that are acquired during the second time of scanning to acquire information about non-duplicate WLAN access points that are acquired during the two times of scanning;
acquiring, according to a preset degree-of-contribution function, a degree of contribution of signal strength of each of the non-duplicate WLAN access points to the list orthogonality value;
adding degrees of contribution of all of the non-duplicate WLAN access points;
multiplying a value, which is acquired by the adding, by a preset second time dimension weight factor to acquire an average degree of contribution;
adding a quantity of non-duplicate WLAN access points and a quantity of duplicate WLAN access points that are acquired during the two times of scanning to acquire a quantity of WLAN access points;
dividing the average degree of contribution by the quantity of WLAN access points to acquire a list orthogonality value of the first time of scanning, wherein a list orthogonality value of the second time of scanning is acquired by comparing the information about the multiple WLAN access points that are acquired during the second time of scanning with information about multiple WLAN access points that are acquired during the third time of scanning, a list orthogonality value of the third time of scanning is acquired by comparing the information about the multiple WLAN access points that are acquired during the third time of scanning with information about multiple WLAN access points that are acquired during the fourth time of scanning, and a list orthogonality value of the $(N-1)^{th}$ time of scanning is acquired, assuming that in total N times of scanning are performed in the specified sampling periods within the set time window length; and
adding the list orthogonality values of the first time of scanning, the second time of scanning, and the $(N-1)^{th}$ time of scanning to acquire a list orthogonality value of the N times of scanning within the set time window length.

4. The method according to claim 1, further comprising determining that the motion status of the mobile terminal cannot be identified when the calculated belief value is less than the preset belief decision threshold.

5. The method according to claim 1, further comprising:
calculating a signal fluctuation rate according to the information about the multiple WLAN access points that are acquired within the set time window length; and comparing the calculated signal fluctuation rate with a preset signal fluctuation rate decision threshold when the calculated list orthogonality value is greater than the minimum value of the preset list orthogonality decision threshold and less than the maximum value of the preset list orthogonality decision threshold value.

6. The method according to claim 5, further comprising:
determining that the motion status of the mobile terminal is walking when the calculated signal fluctuation rate is greater than the preset signal fluctuation rate decision threshold; and
determining that the motion status of the mobile terminal is still when the calculated signal fluctuation rate is less than the preset signal fluctuation rate decision threshold.

7. The method according to claim 5, further comprising:
determining that the motion status of the mobile terminal is walking when the calculated signal fluctuation rate is greater than the preset signal fluctuation rate decision threshold; and
determining that the motion status of the mobile terminal is still when the calculated signal fluctuation rate is equal to the preset signal fluctuation rate decision threshold.

8. The method according to claim 1, further comprising setting a motion status, which occurs for most times in motion statuses of the mobile terminal within several successive time windows, of the mobile terminal as a final motion status of the mobile terminal within the several successive time windows.

9. A mobile terminal, comprising:
a processor;
a communication interface;
a memory; and
a bus,
wherein the processor, the communication interface and the memory accomplish mutual communication using the bus,
wherein the communication interface is configured to communicate with another device,
wherein the memory is configured to store an application, and
wherein the processor is configured to execute the application stored in the memory to:
scan for wireless local area network (WLAN) access points of the mobile terminal once every specified sampling period, and collect information about multiple WLAN access points that are acquired during each time of scanning, wherein the information comprises a basic service set identifier and signal strength;
calculate a belief value and a list orthogonality value according to the information about the multiple WLAN access points that are acquired within a set time window length, wherein the set time window length is n sampling period, wherein n is an integral multiple, wherein the belief value is an average length of WLAN access point lists within the set time window length, and wherein the list orthogonality value is a weighted average of (n−1) orthogonalities that are acquired by separately calculating orthogonality between the last list and previous (n−1) lists within the time window;
compare the calculated belief value with a preset belief decision threshold;

compare the calculated list orthogonality value with a preset list orthogonality decision threshold when the calculated belief value is greater than the preset belief decision threshold;

determine that motion status of the mobile terminal is still when the calculated list orthogonality value is less than a minimum value of the preset list orthogonality decision threshold; and determine that motion status of the mobile terminal is driving when the calculated list orthogonality value is greater than a maximum value of the preset list orthogonality decision threshold.

10. The mobile terminal according to claim 9, wherein the processor being configured to execute the application to calculate the belief value includes being configured to execute the application to:

multiply a quantity of multiple WLAN access points acquired during the scanning performed every specified sampling period by a preset first time dimension weight factor to calculate an average quantity of WLAN access points after each time of scanning; and add all the average quantities of WLAN access points to acquire the belief value, wherein the average quantities are calculated within the set time window length.

11. The mobile terminal according to claim 9, wherein the processor being configured to execute the application to calculate the list orthogonality value includes being configured to execute the application to:

compare, within the set time window length, information about multiple WLAN access points that are acquired during the first time of scanning with information about multiple WLAN access points that are acquired during the second time of scanning to acquire information about non-duplicate WLAN access points that are acquired during the two times of scanning;

acquire, according to a preset degree-of-contribution function, a degree of contribution of signal strength of each of the non-duplicate WLAN access points to the list orthogonality value;

add degrees of contribution of all of the non-duplicate WLAN access points;

multiply a value, which is acquired by the adding, by a preset second time dimension weight factor to acquire an average degree of contribution;

add a quantity of non-duplicate WLAN access points and a quantity of duplicate WLAN access points that are acquired during the two times of scanning to acquire a value of a quantity of WLAN access points;

divide the average degree of contribution by the quantity of WLAN access points to acquire a list orthogonality value of the first time of scanning, wherein a list orthogonality value of the second time of scanning is acquired by comparing the information about the multiple WLAN access points that are acquired during the second time of scanning with information about multiple WLAN access points that are acquired during the third time of scanning, a list orthogonality value of the third time of scanning is acquired by comparing the information about the multiple WLAN access points that are acquired during the third time of scanning with information about multiple WLAN access points that are acquired during the fourth time of scanning, and a list orthogonality value of the $(N-1)^{th}$ of scanning is acquired, assuming that in total N times of scanning are performed in the specified sampling periods within the set time window length; and add the list orthogonality values of the first time of scanning, the second time of scanning, and the $(N-1)^{th}$ time of scanning to acquire a list orthogonality value of the N times of scanning within the set time window length.

12. The mobile terminal according to claim 9, wherein the processor is further configured to execute the application to determine that motion status of the mobile terminal cannot be identified when the calculated belief value is less than the preset belief decision threshold.

13. The mobile terminal according to claim 9, wherein the processor is further configured to execute the application to calculate a signal fluctuation rate according to the information about the multiple WLAN access points that are acquired within the set time window length, and compare the calculated signal fluctuation rate with a preset signal fluctuation rate decision threshold when the calculated list orthogonality value is greater than the minimum value of the preset list orthogonality decision threshold and less than the maximum value of the list orthogonality decision threshold.

14. The mobile terminal according to claim 13, wherein the processor is further configured to execute the application to determine that motion status of the mobile terminal is walking when the calculated signal fluctuation rate is greater than the preset signal fluctuation rate decision threshold, and determine that motion status of the mobile terminal is still when the calculated signal fluctuation rate is less than the preset signal fluctuation rate decision threshold.

15. The mobile terminal according to claim 13, wherein the processor is further configured to execute the application to determine that motion status of the mobile terminal is walking when the calculated signal fluctuation rate is greater than the preset signal fluctuation rate decision threshold, and determine that motion status of the mobile terminal is still when the calculated signal fluctuation rate is equal to the preset signal fluctuation rate decision threshold.

16. The mobile terminal according to claim 9, wherein the processor is further configured to execute the application to set a motion status, which occurs for most times in motion statuses of the mobile terminal within several successive time windows of the mobile terminal as a final motion status of the mobile terminal within the several successive time windows.

* * * * *